United States Patent Office 2,944,518
Patented July 12, 1960

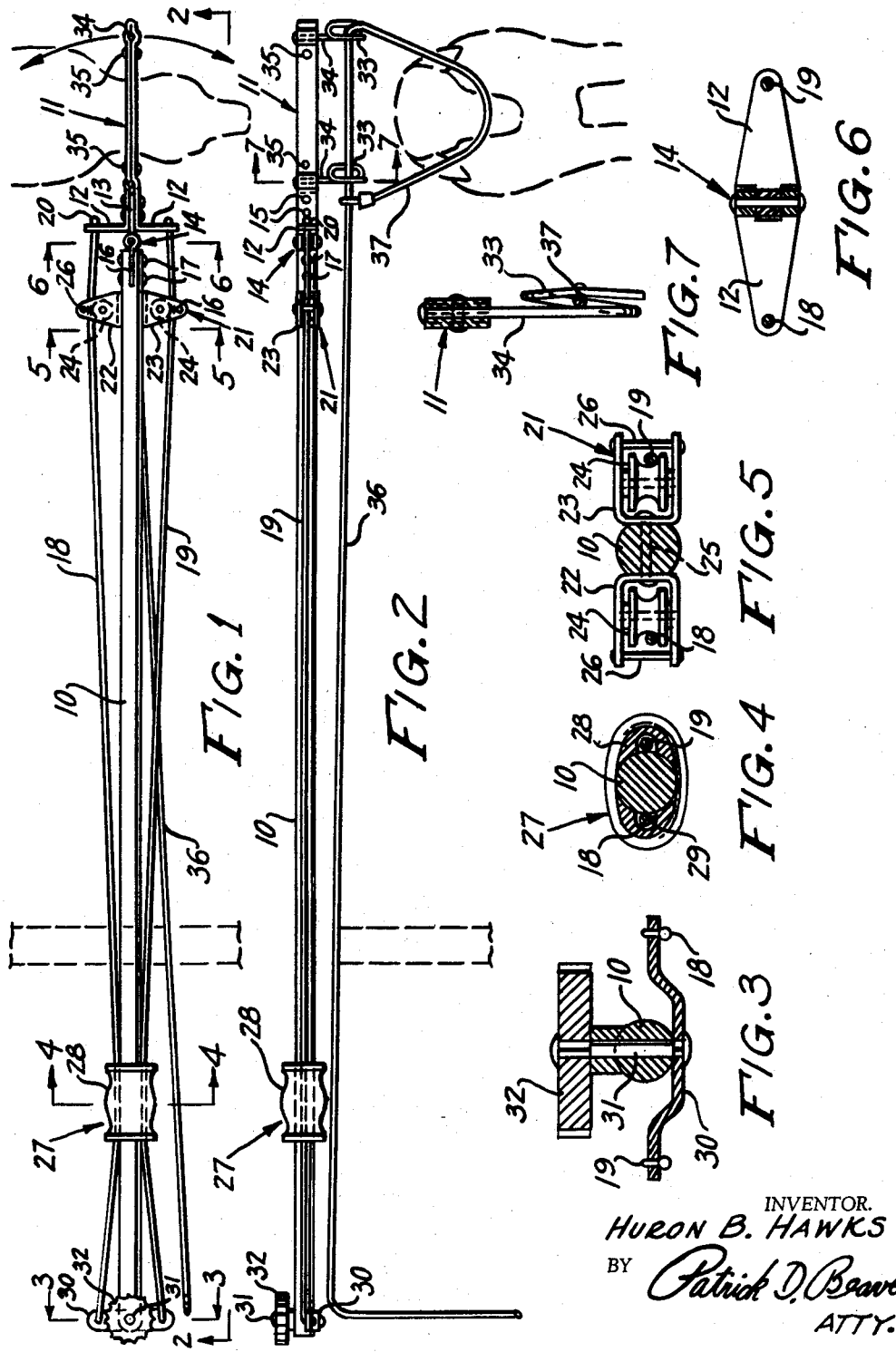

2,944,518

LARIAT HOLDER AND GUIDE

Huron B. Hawks, Box 125, Hollis, Ark.

Filed Nov. 24, 1958, Ser. No. 775,950

4 Claims. (Cl. 119—153)

This invention relates to improvements in lariats for roping livestock and the principal object is to provide a lariat holder and guide, whereby a lariat noose can be held in proper position to engage over the head of livestock.

Another important object of the invention is to provide a holder and guide for rope lariats whereby a lariat noose can be held in extended position and guided over an animal in a quicker and more efficient manner than the present practice of manually lassoing such creatures.

Another important object of the invention is to provide a lariat holder guide which can be used by a person walking or riding horseback and in instances where an animal is to be selected and held within a pen or other enclosure, permitting this device to be extended over the pen enclosure or in instances where the animal has been cornered.

These and various other objects and advantages of the invention will become apparent to the reader of the following description.

In the drawings:

Figure 1 is a top plan view of the holder and lariat, as it would appear to a person looking downwardly on the same, this view showing the noose being engaged over the head of an animal.

Figure 2 is a side elevational view showing in broken lines, an animal about to be engaged.

Figure 3 is an enlarged sectional view taken on line 3—3 of Figure 1.

Figure 4 is a section taken on line 4—4 of Figure 1.

Figure 5 is a section taken on line 5—5 of Figure 1.

Figure 6 is a section taken substantially on line 6—6 of Figure 1.

Figure 7 is a section taken substantially on line 7—7 of Figure 2.

Referring to the drawings wherein like numerals designate like parts, it can be seen that numeral 10 denotes an elongated pole provided with a swingable wing structure at one end, generally referred to by numeral 11. This wing structure can be constructed in a number of ways, that illustrated consisting of an elongated iron strap, bent upon itself and at its inner ends bent laterally to provide arms 12, 12, which embrace a plate 13 of a hinge structure 14. The portions of the strap which embrace the hinge plate 13 are secured to the hinge plate by rivets 15, and likewise the other hinge plate 16 of the hinge 14 is disposed into a slot in the pole 10 and secured by rivets or the like 17. Thus the wing structure 11 is hingedly connected to the forward end of the pole 10 for swinging movement in a substantially horizontal plane, as suggested by arcuate arrows in Figure 1.

It will be observed that in broken lines in Figure 1, an animal is shown after its head has been engaged in the loop of the lariat (to be described below).

Numerals 18, 19 denote a pair of cables or rods, the forward ends of which extend through openings in the extremities of the arms 12, 12 and are secured thereto or provided with heads or enlargements 20.

Guide means generally referred to by numeral 21 are provided for the cables 18, 19, and these guide means as shown in Figure 5 consist preferably of horizontally disposed U-shaped brackets 22, 23, within each of which a grooved roller 24 is mounted and against which the corresponding cable 18 or 19 can ride. The bite portions of these brackets 22, 23 are secured by one or more rivets 25 to the forward end portion of the pole 10.

The leg portions of these brackets 22, 23 at their outer ends are provided with cross pins 26, to prevent displacement of the cables away from the rollers 24.

Adjacent the rear end of the pole 10 is a guide assembly and handle generally referred to by numeral 27, this consisting of an undulated grip 28 to accommodate the hand of the operator; and the side portions of this grip have longitudinal openings 29 therein through which the corresponding cables 18, 19 pass and connect at their rear ends to the ends of a rocker 30. The intermediate portion of the rocker is secured to one end of a shaft 31. The intermediate portion of the shaft 31 extends transversely through and is journaled in the rear end of the pole 10. The shaft 31 and rocker 30 are manually oscillated by a hand knob 32 which is secured to the other end of the shaft 31.

Open spring clips 33, 33 are carried by the wing structure 11, each having a shank 34, which extends upwardly and between side portions of the strap iron of the wing structure 11 and is thus clamped and fixed in position by rivets or the like 35.

Numeral 36 denotes an elongated rope or lariat having a loop or noose 37 at one end and in the operation of this lariat holder, the noose is detachably gripped in the spring clips 33, 33. The rope 36 extends rearwardly and is controlled by one hand of the operator.

It can now be seen in the use and operation of this device, that the wing structure 11 is first set by actuation of the knob 32 to the correct angular position with respect to the pole 10 depending upon, to a considerable extent, under what conditions an animal has to be captured.

Looking at Figure 2, it can be seen that the loop 37 is in advance of an animal's head. This loop is moved toward the animal and by manipulation is placed over his head, while at the same time the rope 36 is pulled, to tighten the noose. Almost simultaneously, due to the activation of the animal, the loop or noose will be pulled loose from the clips 33, 33, whereupon the operator can then drop or otherwise set aside the pole and its adjuncts and depend solely upon the lariat itself in further controlling and consummating the capture of the animal.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A lariat holder comprising an elongated handle, a vertically hinged section at an outer end of the handle, a lariat provided with a noose, a hinged section control means for angularly adjusting the hinged section relative to the handle, at least two longitudinally spaced spring clips supported by the hinged section and detachably engaging and supporting the noose in an open position, said control means including a manually operable shaft supported by and journaled in the other end of the handle, arms fixed to and extending laterally from said shaft, cables connected to the arms and to said hinged section, and guide means supported by the handle, between said hinged section and shaft, and in which said cables are slidably guided.

2. A lariat holder as in claim 1, a handgrip secured to the handle between said guide means and shaft and having bores through which portions of said cables slidably extend.

3. A lariat holder comprising an elongated rigid handle, an elongated rigid noose holder, means swingably connecting one end of the noose holder to an end of the handle for swinging movement of the noose holder in substantially a horizontal plane relative to the handle, at least two spring clips supported by the noose holder in spaced apart relation to one another, said spring clips being adapted to detachably engage and support a lariat noose in an open position, and manually actuated means supported by the handle and connected to the noose holder and operable for angularly adjusting the noose holder relative to the handle.

4. In combination with a lariat including a noose, a lariat holder comprising an elongated rigid handle, an elongated rigid noose holder, means swingably connecting one end of the noose holder to an end of the handle for swinging movement of said noose holder in substantially a horizontal plane relative to the handle, two spring clips supported by the noose holder and detachably engaging and supporting the noose in an open position, and manually actuated means supported by the handle and connected to the noose holder and operable for angularly adjusting the noose holder relative to the handle.

References Cited in the file of this patent

UNITED STATES PATENTS

| | | |
|---|---|---|
| 511,148 | Jones | Dec. 19, 1893 |
| 873,514 | Davis | Dec. 10, 1907 |
| 2,518,179 | Quinby et al. | Aug. 8, 1950 |
| 2,838,866 | Labin | June 17, 1958 |